H. E. PENNEY.
VEHICLE BRAKE.
APPLICATION FILED JUNE 17, 1909.
949,246.
Patented Feb. 15, 1910.
2 SHEETS—SHEET 1.
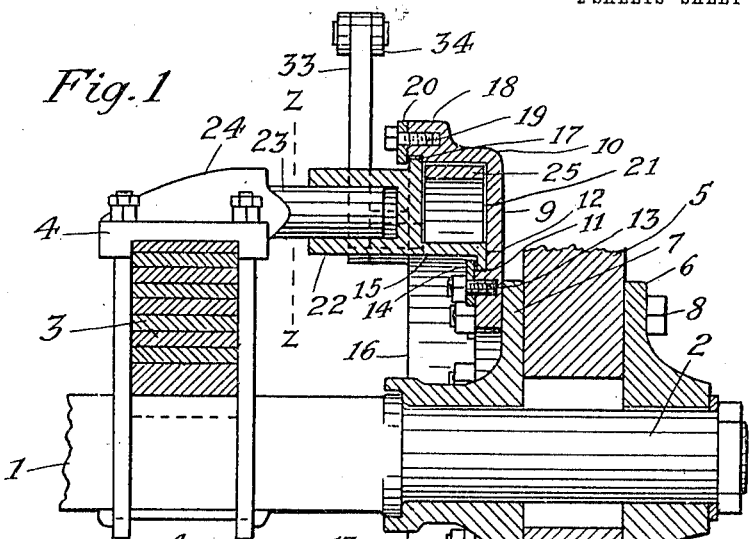
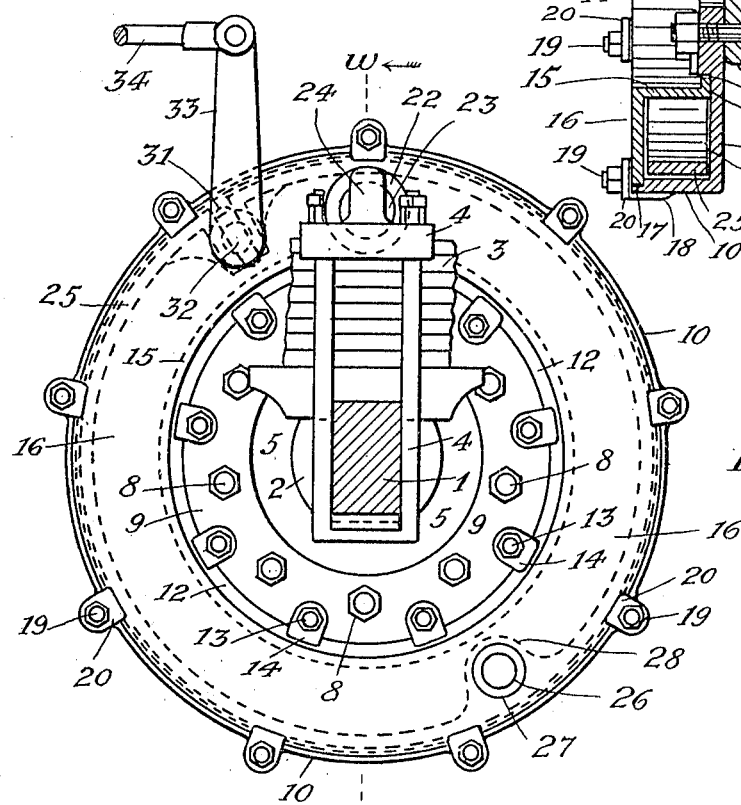
Witnesses:
Theo. Laggard
H. A. Bowman
Inventor:
Herbert E. Penney.
By O. T. Gunckel
his Attorney.

H. E. PENNEY.
VEHICLE BRAKE.
APPLICATION FILED JUNE 17, 1909.
949,246.
Patented Feb. 15, 1910.
2 SHEETS—SHEET 2.
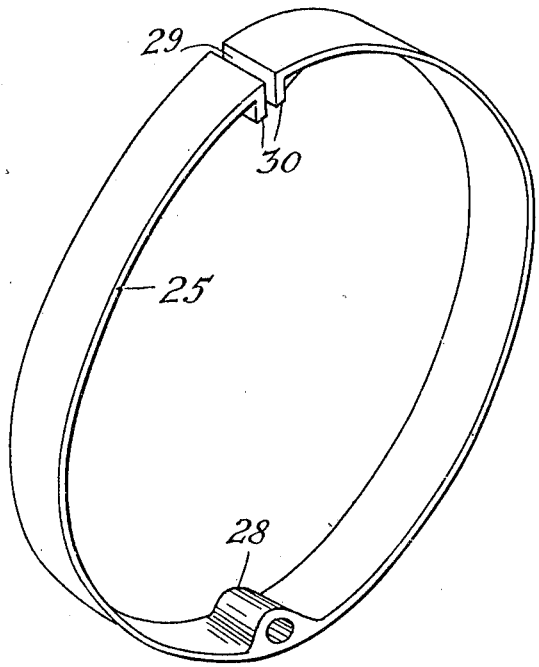
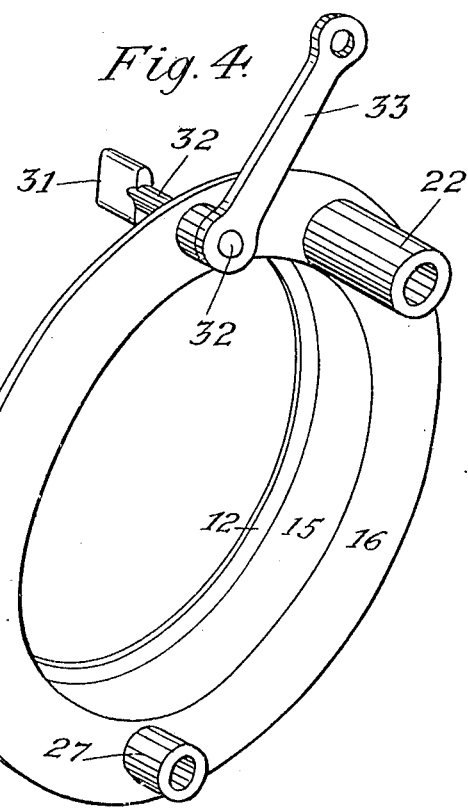
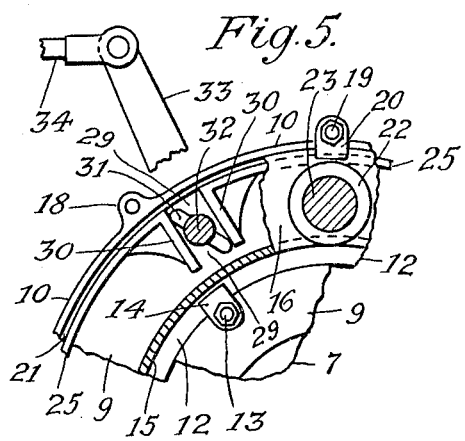
Witnesses:
Inventor:
Herbert E. Penney.
By his Attorney.

UNITED STATES PATENT OFFICE.

HERBERT E. PENNEY, OF MINNEAPOLIS, MINNESOTA, ASSIGNOR TO NOTT FIRE ENGINE COMPANY, OF MINNEAPOLIS, MINNESOTA, A CORPORATION.

VEHICLE-BRAKE.

949,246.   Specification of Letters Patent.   Patented Feb. 15, 1910.

Application filed June 17, 1909. Serial No. 502,660.

*To all whom it may concern:*

Be it known that I, HERBERT E. PENNEY, a citizen of the United States, residing at Minneapolis, in the county of Hennepin and State of Minnesota, have invented certain new and useful Improvements in Vehicle-Brakes, of which the following is a specification.

My invention relates to vehicle brakes and especially to brakes for fire-engines, automobiles, and the like.

The main object of the invention is to improve the efficiency of the brake by so housing the braking devices as to exclude dirt and by providing means attached to a fixed portion of the running-gear for relieving the brake-lever and connections of the force exerted by the friction of the rotating body upon the brake.

My improvements, generally stated, comprise a pair of plates attached to the inner-side of the hub and provided with circular flanges which overlap to form and close an annular space, a split-ring therein and attached to the housing opposite the ring opening, a device for expanding the ring to frictional contact with the housing, an operating lever therefor, and a locking device rigidly connected with a fixed part of the vehicle running-gear.

My improvements are illustrated in the accompanying drawings, in which—

Figure 1 is a sectional elevation, on the broken line *w—w* of Fig. 2 viewed in the direction of the arrows, showing portions of the running-gear of a fire-engine equipped with my improved brake devices. Fig. 2 is an elevation of the same viewed from the left of Fig. 1. Fig. 3 is a detail view showing the expansion ring, and Fig. 4 is a similar view of the casing member that supports the ring and its expander, and Fig. 5 is an elevation, partly sectional, on the broken line *z—z* of Fig. 1.

In the drawings 1 designates a vehicle axle, in this instance, the hind axle of a fire-engine, 2 the axle arm, 3 a leaf-spring, 4 the clip by which it is secured to the axle, 5 the wheel hub, 6 and 7 the clamp-plates at the sides of the hub, and 8 the bolts for connecting them to the hub.

A centrally open disk 9 having a horizontal flange 10 is attached to the inner side of the plate 7 by two or more of the bolts 8; and the body of the disk is offset to provide a flat shoulder 11. A narrow circular plate or ring 12 is fitted on the shoulder and held in place on the disk by bolts 13 and washers 14. The plate 12 has an angular flange composed of a horizontal member 15 and a vertical member 16, the end of the latter fitting in a recess 17 in the inner margin of the flange 10. The flange 10 is provided at intervals on its inner margin with threaded lugs 18 to receive bolts 19 which, in conjunction with washers 20, serve to hold the flange 16 in place on the flange 10. The parts thus united provide a tight annular chamber 21 surrounding the inner boss of the hub.

On the flange member 16 is formed or attached an inwardly-extending socket stud 22 and into the socket extends loosely a pin 23 from a body 24 that is formed on or secured to the plate of the spring clip 4. The engagement of the pin with the stud prevents the flange 16 from rotating, and obviously holds the attached parts stationary, while the hub and the parts attached to it are free to rotate.

An expansion ring 25 is located in the chamber 21 in close proximity to the inner surface of the flange 10, and is attached to the flange 16 by a bolt 26 entered in bosses 27 and 28 formed respectively on the flange and the ring. Opposite this connection the ring has a transverse slit 29 and the ends 30 are bent inwardly at right angles. Between these ends or lips an expander 31, consisting of a relatively flat body, is supported on the end of a rocking-rod 32 which has its bearing in a stud formed on the flange 16; and to the rod is attached a brake-lever 33 which in turn is pivoted to the brake-rod 34 that is connected with an operating foot-lever (not shown) of usual or suitable construction for swinging the brake-lever to set the brake.

In use, the operation of the brake-lever serves to rock the rod 32 and turn the expander 31 and thereby expand the ring 25 to bring its sides in frictional contact with the flange 10 to retard the rotation of the hub. As the expansion-ring holder is held stationary by the socket-stud 22 and pin 23 and as the brake lever 33 is long compared with the wings of the expander 25 the resistance of the latter is comparatively slight, so that but a small amount of power is required to successfully operate the brake. The casing serves to exclude dirt and dust and adds to the efficiency of the expansion-ring as a braking device.

While the improvements have been described in their application to a fire-engine, they are adapted for use on automobiles and other vehicles, with only slight mechanical changes, and therefore I do not wish to confine myself to their use on fire-engines.

Having described my invention, what I claim and desire to secure by Letters Patent is—

1. In a brake, the combination with a hub having a clamping plate at its inner side, of a casing member secured thereto, a second casing member connected thereto and forming in conjunction therewith an annular chamber, a socket provided on the latter member, a fixed horizontal pin engaging loosely in the socket to allow horizontal but prevent rotary movement of the casing member, an expansion-ring supported in the chamber by the stationary casing member, an expander for spreading the ring to frictional contact with the rotating casing member, and brake-lever devices for actuating the expander, substantially as set forth.

2. In a vehicle brake, the combination with a hub, of a casing member carried thereon, a second casing member loosely fitted thereto to form therewith an annular chamber, a socket piece projecting inwardly from the latter member, a fixed horizontal pin engaging loosely in the socket to allow horizontal but prevent rotary movement of the casing member, an expansion-ring supported in the chamber by the stationary casing member, an expander for spreading the ring to frictional contact with the rotating casing member, and brake-lever devices for actuating the expander, substantially as set forth.

3. In a brake, the combination with a hub having a clamping plate at its inner side, of a casing member secured thereto, a second casing member connected thereto and forming in conjunction therewith an annular chamber, a socket provided on the latter member, a fixed horizontal pin engaging loosely in the socket to allow horizontal but prevent rotary movement of the casing member, an expansion-ring supported in the chamber by the stationary casing member, an expander for spreading the ring to frictional contact with the rotating casing member, a rocking rod for turning the expander, a bearing therefor provided by the stationary member, and brake-lever devices connected to said rod for actuating the expander, substantially as set forth.

In testimony whereof I have signed my name to this specification in the presence of two subscribing witnesses this 14" day of June, 1909.

HERBERT E. PENNEY.

Witnesses:
P. H. GUNCKEL,
H. A. BOWMAN.